United States Patent
Mori et al.

(10) Patent No.: US 10,968,882 B2
(45) Date of Patent: Apr. 6, 2021

(54) MOVABLE-BLADE OPERATION SYSTEM FOR HYDRAULIC MACHINE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Junji Mori, Tokyo (JP); Masahiko Nakazono, Kanagawa (JP); Ryoji Hakataya, Kanagawa (JP); Kouya Inada, Kanagawa (JP); Kenichi Imamura, Tokyo (JP)

(73) Assignees: KABUSHIKI KAISHA TOSHIBA, Tokyo (JP); TOSHIBA ENERGY SYSTEMS & SOLUTIONS CORPORATION, Tokyo (JP)

( * ) Notice: Subject to any disclaimer, the term of this patent is extended or adjusted under 35 U.S.C. 154(b) by 329 days.

(21) Appl. No.: 15/902,366

(22) Filed: Feb. 22, 2018

(65) Prior Publication Data
US 2018/0274515 A1    Sep. 27, 2018

(30) Foreign Application Priority Data
Mar. 24, 2017   (JP) .............................. JP2017-060094

(51) Int. Cl.
*F03B 15/10*   (2006.01)
*F03B 3/14*    (2006.01)
(Continued)

(52) U.S. Cl.
CPC .............. *F03B 15/10* (2013.01); *F03B 3/145* (2013.01); *F15B 1/265* (2013.01); *F15B 11/04* (2013.01);
(Continued)

(58) Field of Classification Search
CPC .......... F03B 13/105; F03B 15/10; F03B 3/06; F03B 3/123; F03B 3/145; F04D 29/36;
(Continued)

(56) References Cited

U.S. PATENT DOCUMENTS 3,895,598 A    7/1975  Blickle
6,139,272 A *  10/2000 Thyberg .................. F03B 3/123
                                                    416/146 A

FOREIGN PATENT DOCUMENTS

DE    2 308 931       9/1974
JP    S51-13443 U1    2/1976
(Continued)

OTHER PUBLICATIONS

"Bi-directional pump or valve configuration?" http://www.eng-tips.com/viewthread.cfr?qid=324747 (accessed Apr. 5, 2018).

*Primary Examiner* — Igor Kershteyn
*Assistant Examiner* — Julian B Getachew
(74) *Attorney, Agent, or Firm* — Finnegan, Henderson, Farabow, Garrett & Dunner L.L.P.

(57) ABSTRACT

A movable-blade operation system for a hydraulic machine according to an embodiment includes an oil hydraulic cylinder installed within a rotational shaft, a bidirectional pump, a pump drive motor, a control unit, and an oil head installed in the hydraulic machine. The bidirectional pump selectively feeds pressurized hydraulic oil to one of a first cylinder chamber and a second cylinder chamber. The oil head couples the rotational shaft rotatably, and the hydraulic oil fed from the bidirectional pump to the first cylinder chamber and the second cylinder chamber flows through the oil head. The bidirectional pump, the pump drive motor, and the control unit are installed outside the hydraulic machine.

6 Claims, 3 Drawing Sheets

(51) Int. Cl.

| | | |
|---|---|---|
| *F15B 1/26* | (2006.01) | |
| *F15B 11/04* | (2006.01) | |
| *F15B 11/08* | (2006.01) | |
| *F15B 13/02* | (2006.01) | |
| *F15B 21/08* | (2006.01) | |
| *B63H 3/02* | (2006.01) | |
| *F03B 13/10* | (2006.01) | |

(52) U.S. Cl.
CPC ............ *F15B 11/08* (2013.01); *F15B 13/029* (2013.01); *F15B 21/08* (2013.01); *B63H 3/02* (2013.01); *F03B 13/105* (2013.01); *F05B 2220/32* (2013.01); *F05B 2220/706* (2013.01); *F05B 2270/101* (2013.01); *F05B 2270/506* (2013.01); *F05B 2270/604* (2013.01); *F15B 2211/20515* (2013.01); *F15B 2211/26* (2013.01); *F15B 2211/27* (2013.01); *F15B 2211/63* (2013.01); *F15B 2211/7051* (2013.01); *Y02E 10/20* (2013.01)

(58) Field of Classification Search
CPC .. F05D 2260/74; F05D 2260/76; F15B 1/265; F15B 11/04; F15B 11/08; F15B 13/029; F15B 21/08; F15B 2211/20515; F15B 2211/26; F15B 2211/27; F15B 2211/63; F15B 2211/7051; B64C 11/38; B63H 3/02; F05B 2220/706; F05B 2270/101; F05B 2270/506; F05B 2270/604; F05B 2220/32
USPC ....................................................... 416/155
See application file for complete search history.

(56) References Cited

FOREIGN PATENT DOCUMENTS

| | | |
|---|---|---|
| JP | S59-64480 U1 | 4/1984 |
| JP | 59-90702 A | 5/1984 |
| JP | H05-296132 A | 11/1993 |
| JP | H06-307325 A | 11/1994 |
| JP | H07-270148 A | 10/1995 |
| JP | H08-189452 A | 7/1996 |
| JP | H09-303301 A | 11/1997 |
| JP | 2008-57362 A | 3/2008 |
| JP | 2016-156348 A | 9/2016 |
| JP | 2016-156349 A | 9/2016 |
| WO | WO 2016/138960 A1 | 9/2016 |

* cited by examiner

MOVABLE-BLADE OPERATION SYSTEM FOR HYDRAULIC MACHINE

CROSS-REFERENCE TO RELATED APPLICATIONS

This application is based upon and claims the benefit of priority from Japanese Patent Application No. 2017-060094 filed on Mar. 24, 2017; the entire contents of which are incorporated herein by reference.

FIELD

Embodiments of the present invention relate to a movable-blade operation system for a hydraulic machine.

BACKGROUND

A hydraulic machine includes runner vanes that experience a water current force to drive the rotation of an electric generator. The runner vanes in the hydraulic machine such as a bulb turbine or a Kaplan turbine have adjustable opening. To adjust the runner vane opening, a movable-blade operation system is installed. The movable-blade operation system may also be used to adjust the opening of guide vanes installed for regulating a water current flowing into the runner.

Known examples of the movable-blade operation system include a movable-blade operation system with a pressure oil tank and a compressor. In the movable-blade operation system, the compressor increases the pressure of the hydraulic oil contained in the pressure oil tank. The pressurized hydraulic oil in the pressure oil tank is fed to an oil hydraulic cylinder to adjust the opening of the movable blades. Components such as the pressure oil tank and the compressor are installed outside the main body of the hydraulic machine (e.g., the bulb of a bulb turbine).

However, such a movable-blade operation system with a pressure oil tank uses a larger amount of hydraulic oil. Thus, if an oil leakage should happen, a large amount of leakage oil would adversely affect the environment.

As a technique to offset the difficulty, for a small or medium capacity hydraulic machine, an electric-servo movable-blade operation apparatus is known that includes an electric servomotor as an actuator. This operation apparatus may use a smaller amount of hydraulic oil, and even if an oil leakage should happen, its amount may be reduced. The operation apparatus may thus be environment-friendly.

However, in the electric-servo movable-blade operation apparatus, the electric servomotor and each movable blade are connected via a ball screw, which is a special part. Thus, the replacement of a ball screw following a failure or a similar event takes a long time.

To overcome the difficulty, electric-servo movable-blade operation apparatuses for guide vanes have been replaced with direct-pressurizing movable-blade operation systems that include general-purpose components. A direct-pressurizing movable-blade operation system directly feeds hydraulic oil pressurized by a pump or other mechanism to an oil hydraulic cylinder without using the pressure oil tank described above. This system may thus use a smaller amount of hydraulic oil.

However, the oil hydraulic cylinder (oil hydraulic servomotor) for runner vanes is installed within a rotational shaft that rotates together with the runner. Thus, if a direct-pressurizing movable-blade operation system for runner vanes is used, a runner vane controller including a pump for feeding pressurized hydraulic oil to the oil hydraulic cylinder of other mechanism is installed within the main body of the hydraulic machine and near the rotational shaft.

Thus, in order to modify a movable-blade operation system with a pressure oil tank of other mechanism as described above into a direct-pressurizing movable-blade operation system, a runner vane controller is installed within the main body of the hydraulic machine, and the main body of the hydraulic machine is substantially remodeled. This modification of the movable-blade operation system may involve a heavy workload and a long working time.

DETAILED DESCRIPTION

Figure 1:
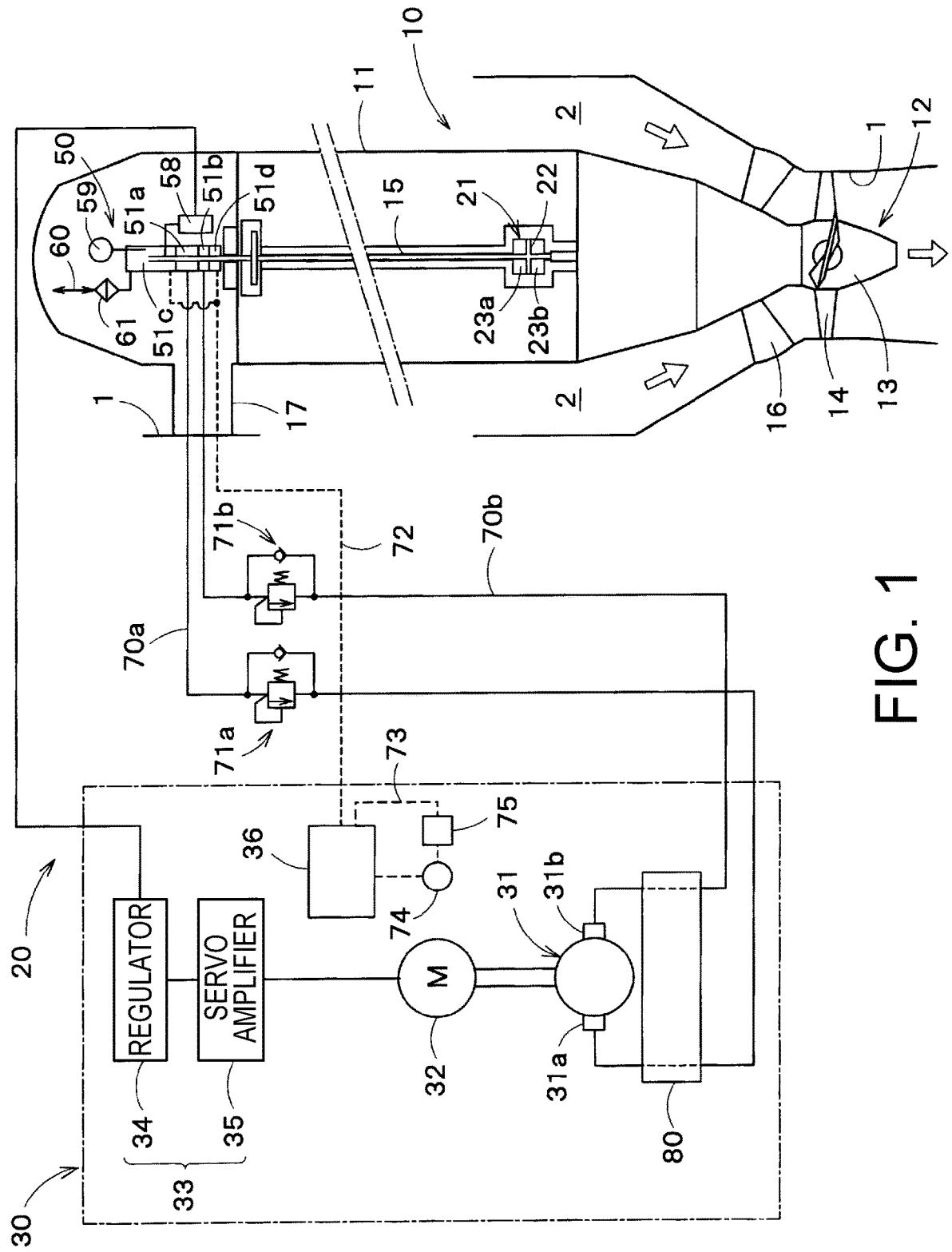
FIG. 1 illustrates the whole configuration of a movable-blade operation system for a hydraulic machine according to one embodiment.

A movable-blade operation system for a hydraulic machine according to an embodiment adjusts the opening of movable blades that rotate together with a rotational shaft of the hydraulic machine. The movable-blade operation system includes an oil hydraulic cylinder in the rotational shaft, a bidirectional pump, a pump drive motor for driving the bidirectional pump, a control unit for controlling the pump drive motor, and an oil head in the hydraulic machine. The oil hydraulic cylinder includes a piston connected to the movable blades, and a first cylinder chamber and a second cylinder chamber defined by the piston. The bidirectional pump selectively feeds pressurized hydraulic oil to one of the first cylinder chamber and the second cylinder chamber. The oil head, to which the rotational shaft is rotatably connected, allows the passage of the hydraulic oil to be fed from the bidirectional pump to the first cylinder chamber and the second cylinder chamber. The bidirectional pump, the pump drive motor, and the control unit are installed outside the hydraulic machine.

The movable-blade operation system for the hydraulic machine according to one embodiment of the present invention will now be described with reference to the drawings. In this example, the hydraulic machine is a bulb turbine.

A bulb turbine 10 will now be described first with reference to FIG. 1.

The bulb turbine 10 is installed in a water flow channel through which water flows from an upper reservoir (not shown). The water flow channel is defined by a channel wall 1 formed as a civil engineering structure. In the present embodiment, the channel wall 1 extends in a perpendicular direction, and the bulb turbine 10 illustrated in FIG. 1 is a vertical shaft bulb turbine.

The bulb turbine 10 includes a bulb 11 (main body of the hydraulic machine) and a rotatable runner 12 installed at the downstream end of the bulb 11. The runner 12 includes a runner hub 13 and multiple runner vanes 14 (movable blades) retained on the runner hub 13. The runner vanes 14 are turnable about the runner hub 13, and the opening of the runner vanes 14 is adjustable. The bulb 11 contains an electric generator (not shown), which is connected with the runner hub 13 via a rotational shaft 15. With this structure, when the runner vanes 14 receive a water current, the runner vanes 14, the runner hub 13, and the rotational shaft 15 rotate together with each other. The resulting rotational drive force allows the electric generator to generate electric power. Running water that has exited the runner 12 flows into a lower reservoir (or a tailrace) (not shown).

The bulb 11 and the channel wall 1 of the bulb turbine 10 have a flow channel 2 between them. In the flow channel 2, water that has entered the runner 12 flows. The flow channel 2 includes multiple guide vanes 16 (guide blades) upstream of the runner 12. The guide vanes 16 can adjust the amount of a water current flowing into the runner 12. The guide vanes 16 are turnable about the bulb 11, and the opening of the guide vanes 16 is adjustable.

An access port 17 is formed upstream of the guide vanes 16. The access port 17 extends from the bulb 11 to the channel wall 1 and allows an internal inspection of the bulb 11 in the bulb turbine 10. The access port 17 also functions as a support for the bulb 11 together with other members (not shown).

A movable-blade operation system 20 for the hydraulic machine according to the present embodiment adjusts the opening of the runner vanes 14 as described above. The movable-blade operation system 20 will now be described.

As illustrated in FIG. 1, the movable-blade operation system 20 includes an oil hydraulic cylinder 21 (runner vane servomotor) installed within the rotational shaft 15, a runner vane controller 30 for controlling the oil hydraulic cylinder 21, and an oil head 50. In the present embodiment, the runner vane controller 30 includes a bidirectional pump 31, an AC servomotor 32, and a control unit 33, which are described later, and is located outside the bulb 11 of the bulb turbine 10. For example, the runner vane controller 30 is suitably located in the building of a hydroelectric power plant including the bulb turbine 10.

The oil hydraulic cylinder 21 includes a piston 22 connected to the runner vanes 14, and a first cylinder chamber 23a and a second cylinder chamber 23b defined by the piston 22. The piston 22 is connected to the runner vanes 14 via a runner vane operation mechanism (not shown) including an operation rod. In the present embodiment, the oil hydraulic cylinder 21 is installed within the rotational shaft 15 and near the runner 12. This arrangement allows the runner vane operation mechanism to be simplified in structure, offering advantages in mechanical strength.

The first cylinder chamber 23a and the second cylinder chamber 23b are filled with hydraulic oil fed from the bidirectional pump 31 of the runner vane controller 30. When the pressure of the hydraulic oil contained in the first cylinder chamber 23a exceeds the pressure of the hydraulic oil contained in the second cylinder chamber 23b, the runner vanes 14 turn in a first direction (e.g., the opening direction). When the pressure of the hydraulic oil contained in the second cylinder chamber 23b exceeds the pressure of the hydraulic oil contained in the first cylinder chamber 23a, the runner vanes 14 turn in a second direction opposite to the first direction (e.g., the closing direction).

Figure 2:
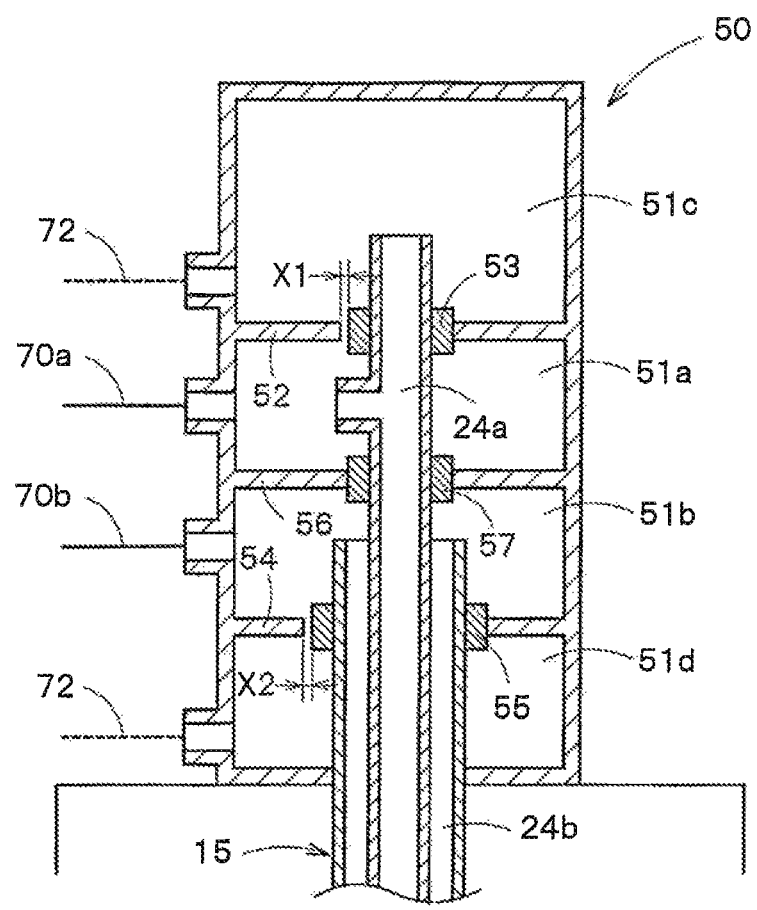
FIG. 2 is an enlarged schematic view illustrating the structure of an oil head illustrated in FIG. 1.

As illustrated in FIG. 2, the rotational shaft 15 of the bulb turbine 10 includes a first internal channel 24a communicating with the first cylinder chamber 23a and a second internal channel 24b communicating with the second cylinder chamber 23b. In the present embodiment, the first internal channel 24a extends along the central axis of rotation of the rotational shaft 15, whereas the second internal channel 24b is cylindrical and formed concentrically around the first internal channel 24a.

As illustrated in FIG. 1, the runner vane controller 30 includes the bidirectional pump 31 for selectively feeding pressurized hydraulic oil to one of the first cylinder chamber 23a and the second cylinder chamber 23b, the AC servomotor 32 (pump drive motor) for driving the bidirectional pump 31, and the control unit 33 for controlling the AC servomotor 32. The bidirectional pump 31 includes a first port 31a and a second port 31b, and draws hydraulic oil in via one of the first port 31a and the second port 31b, and discharges the hydraulic oil via the other.

The control unit 33 includes a regulator 34 (control command unit) for issuing a rotational speed command value to the AC servomotor 32, and a servo amplifier 35 (amplifier) for supplying the AC servomotor 32 with the power corresponding to the rotational speed command value issued from the regulator 34. When the servo amplifier 35 supplies the AC servomotor 32 with the power corresponding to the rotational speed command value, the AC servomotor 32 drives the bidirectional pump 31 in a forward direction or a reverse direction to feed pressurized hydraulic oil from the bidirectional pump 31 to one of the first cylinder chamber 23a and the second cylinder chamber 23b.

Figure 3:
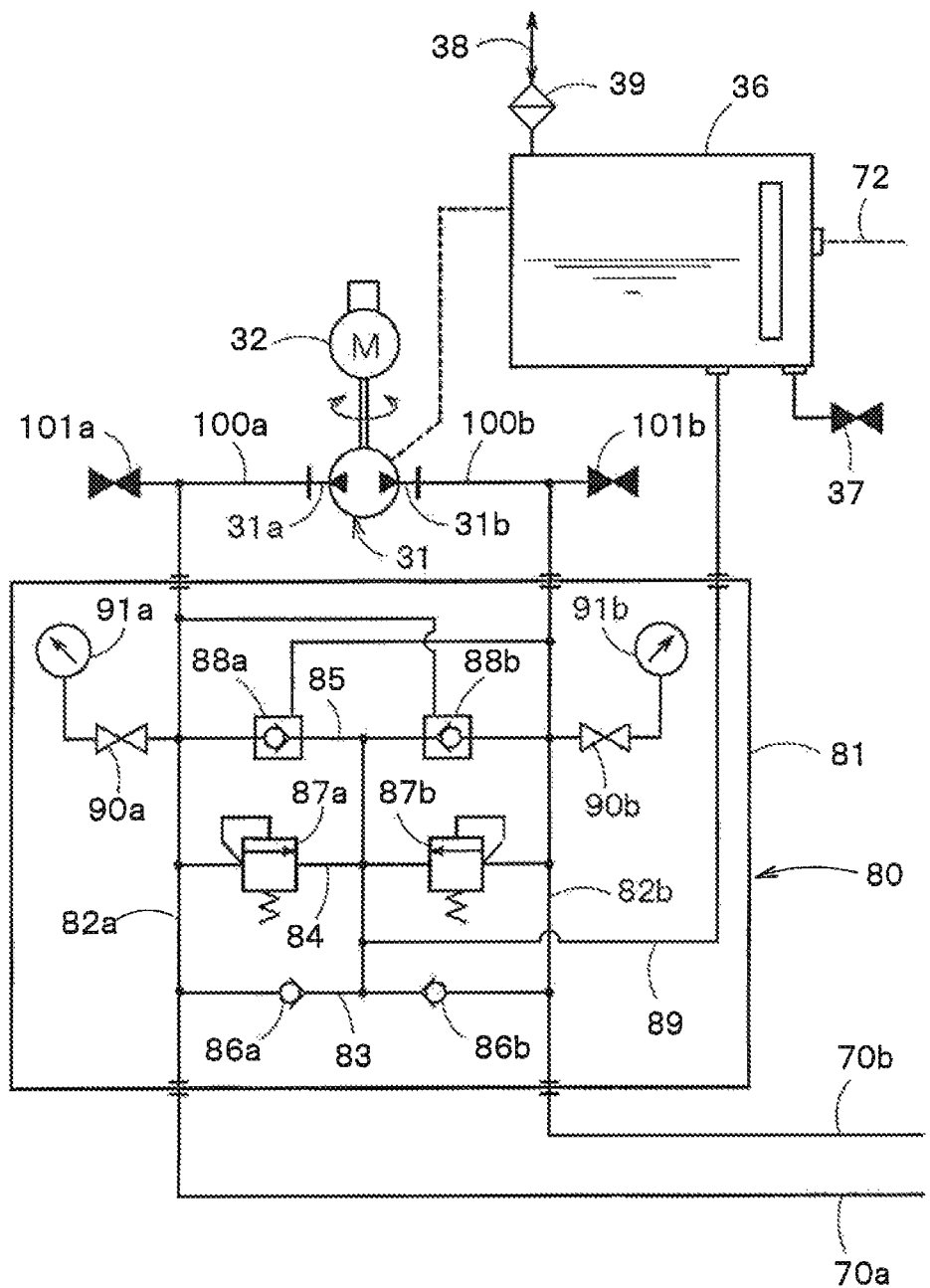
FIG. 3 is a detailed view illustrating the configuration of a runner vane controller in FIG. 1.

The runner vane controller 30 further includes a sump tank 36 storing hydraulic oil to be fed to the first cylinder chamber 23a and the second cylinder chamber 23b, and an oil pressure regulator 80, which are installed outside the bulb 11 of the bulb turbine 10. When an insufficient amount of hydraulic oil is fed to the first cylinder chamber 23a or the second cylinder chamber 23b, the hydraulic oil stored in the sump tank 36 is supplied to a first pipe 70a or a second pipe 70b described later. As illustrated in FIG. 3, the sump tank 36 has an exhaust valve 37 that allows the hydraulic oil in the sump tank 36 to be discharged. The sump tank 36 also has a vent 38 that allows the pressure in the sump tank 36 to be maintained at atmospheric pressure. The vent 38 has a filter 39. The oil pressure regulator 80 will be described in detail later.

As illustrated in FIG. 1, the bulb 11 of the bulb turbine 10 contains the oil head 50. In FIG. 1, the oil head 50 is placed at the upstream end of the bulb 11. The rotational shaft 15 is rotatably coupled to the oil head 50, which allows the passage of the hydraulic oil to be fed from the bidirectional pump 31 to the first cylinder chamber 23a and the second cylinder chamber 23b.

As illustrated in FIGS. 1 and 2, the oil head 50 includes a first head chamber 51a that connects the first port 31a of the bidirectional pump 31 and the first cylinder chamber 23a, and a second head chamber 51b that connects the second port 31b of the bidirectional pump 31 and the second cylinder chamber 23b. More specifically, the first head chamber 51a connects the first pipe 70a (described later) and the first internal channel 24a, whereas the second head chamber 51b connects the second pipe 70b (described later) and the second internal channel 24b.

The first head chamber 51a and the second head chamber 51b are adjacent to each other along the axis of the rotational shaft 15 (in vertical directions in FIG. 2). The first head chamber 51a is adjacent to a third head chamber 51c, whereas the second head chamber 51b is adjacent to a fourth head chamber 51d. In the present embodiment, the fourth head chamber 51d, the second head chamber 51b, the first head chamber 51a, and the third head chamber 51c are arranged in this order in a direction away from the oil hydraulic cylinder 21.

As illustrated in FIG. 2, the first head chamber 51a and the third head chamber 51c are separated by a first divider 52. The rotational shaft 15 extends through the first divider 52. The first divider 52 and the rotational shaft 15 have a first seal 53 between them. The first seal 53 and the first divider 52 have a gap X1 between them. This structure allows the hydraulic oil contained in the first head chamber 51a to partially flow into the third head chamber 51c. Note that the gap X1 is just wide enough to allow an effective increase in the pressure of the hydraulic oil contained in the first cylinder chamber 23a. The gap X1 is opened not in whole circumference of the first seal 53, but is partially formed in the circumference. The first seal 53 is supported by the first divider 52.

The second head chamber 51b and the fourth head chamber 51d are separated by a second divider 54. The rotational shaft 15 extends through the second divider 54. The second divider 54 and the rotational shaft 15 have a second seal 55 between them. Any gap through which hydraulic oil is made to flow, like the gap X1, is not formed between the second seal 55 and the second divider 54. That is, hydraulic oil is prevented from traveling between the second head chamber 51b and the fourth head chamber 51d. However, hydraulic oil in the second head chamber 51b flows into the fourth head chamber 51d via a minute gap, and is stored in the fourth head chamber 51d. The fourth head chamber 51d includes a barrier 62 that prevents the hydraulic oil in the fourth head chamber 51d from flowing into the bulb 11.

The second head chamber 51b is connected with a head line X2 that communicates with the third head chamber 51c, and the hydraulic oil contained in the second head chamber 51b partially flows into the third head chamber 51c. This structure can prevent the depletion of the hydraulic oil contained in the third head chamber 51c, and allows a bearing (not shown) within the third head chamber 51c for rotatably supporting the rotational shaft 15 to be immersed in the hydraulic oil. The structure can also prevent air taken via a vent 60 described later from entering the first head chamber 51a or the like. The head line X2 has a flow channel cross-sectional area just enough to allow an effective increase in the pressure of the hydraulic oil contained in the second cylinder chamber 23b.

The first head chamber 51a and the second head chamber 51b are separated by a third divider 56. The rotational shaft 15 extends through the third divider 56. The third divider 56 and the rotational shaft 15 have a third seal 57 between them. Any gap through which hydraulic oil is made to flow, like the gap X1 or the head line X2, is not formed between the third seal 57 and the third divider 56. That is, hydraulic oil is prevented from traveling between the first head chamber 51a and the second head chamber 51b.

As illustrated in FIG. 1, the oil head 50 includes an opening position detector 58 for detecting the opening position of the runner vanes 14. The opening position detection value for the runner vanes 14 detected by the opening position detector 58 is transmitted to the regulator 34 described above. The regulator 34 calculates the difference between the opening position detection value for the runner vanes 14 transmitted from the opening position detector 58, and an opening position command value into which an opening command value for the runner vanes 14 transmitted from a control apparatus (not shown) is converted. The calculated difference is transmitted to the servo amplifier 35. The servo amplifier 35 determines whether the difference is greater than a predetermined value. The servo amplifier 35 has a changeover function for increasing the rotational speed of the AC servomotor 32 upon determining that the difference is greater than the predetermined value.

The oil head 50 also includes an oil level detector 59 for detecting the oil level of the hydraulic oil contained in the third head chamber 51c. If the value of the oil level detected by the oil level detector 59 is smaller than a predetermined value, the first pipe 70a or the second pipe 70b described later is suitably supplied with hydraulic oil from the sump tank 36. This prevents a lowered oil level from causing air in the third head chamber 51c to enter the first pipe 70a. The oil head 50 also has the vent 60 that connects the inside of the third head chamber 51c and the atmosphere, and thus the internal pressure of the third head chamber 51c is maintained at atmospheric pressure. The vent 60 has a filter 61.

The bidirectional pump 31 and the oil head 50 are coupled by the first pipe 70a and the second pipe 70b. The first pipe 70a connects the first port 31a of the bidirectional pump 31 and the first head chamber 51a of the oil head 50. More specifically, the first pipe 70a extends from the first head chamber 51a of the oil head 50 included in the bulb 11 in a direction away from the bulb 11, and communicates with the first port 31a of the bidirectional pump 31.

Similarly, the second pipe 70b connects the second port 31b of the bidirectional pump 31 and the second head chamber 51b of the oil head 50. More specifically, the second pipe 70b extends from the second head chamber 51b of the oil head 50 included in the bulb 11 in a direction away from the bulb 11, and communicates with the second port 31b of the bidirectional pump 31. In this manner, the first port 31a of the bidirectional pump 31 communicates with the first cylinder chamber 23a via the first head chamber 51a, whereas the second port 31b communicates with the second cylinder chamber 23b via the second head chamber 51b.

The first pipe 70a and the second pipe 70b may also extend through the access port 17 described above. This arrangement enables the first pipe 70a and the second pipe 70b to avoid being exposed to a water current, and allows the pipes 70a, 70b to be simplified in structure, offering advantages in mechanical strength. Each of the first pipe 70a and the second pipe 70b may be formed of multiple pipes connected to each other.

As illustrated in FIG. 1, the first pipe 70a has a first counterbalance valve 71a. The first counterbalance valve 71a prevents a pressure drop of the hydraulic oil contained in the first head chamber 51a of the oil head 50. More specifically, although the first counterbalance valve 71a permits the flow of hydraulic oil from the first port 31a of the bidirectional pump 31 to the first head chamber 51a, the first counterbalance valve 71a prevents the flow of hydraulic oil from the first head chamber 51a to the first port 31a. Thus, upon a pressure drop of the hydraulic oil contained in the first head chamber 51a, hydraulic oil flows from the bidirectional pump 31 to the first head chamber 51a to increase the pressure. This mechanism maintains the pressure of the hydraulic oil contained in the first head chamber 51a at a certain level or higher. In contrast, when the pressure of the hydraulic oil contained in the first head chamber 51a rises to a predetermined value or greater, the first counterbalance valve 71a permits the flow of hydraulic oil from the first head chamber 51a to the bidirectional pump 31. In the present embodiment, the first counterbalance valve 71a and a second counterbalance valve 71b are installed outside the bulb 11 of the bulb turbine 10 as well as outside the runner vane controller 30.

Similarly, the second pipe 70b has the second counterbalance valve 71b. The second counterbalance valve 71b has the same function as the first counterbalance valve 71a, and a detailed description thereof is omitted herein.

As illustrated in FIG. 1, the sump tank 36 and the oil head 50 are coupled by a recovery pipe 72. The recovery pipe 72 extends from the third head chamber 51c and the fourth head chamber 51d of the oil head 50 included in the bulb 11 in a direction away from the bulb 11, and communicates with the sump tank 36. The recovery pipe 72 recovers the hydraulic oil contained in the third head chamber 51c and the hydraulic oil contained in the fourth head chamber 51d and returns them to the sump tank 36. The recovery pipe 72 may extend through the access port 17 like the first pipe 70a and the second pipe 70b.

The sump tank 36 is coupled to a circulation pipe 73 for circulating the stored hydraulic oil. The circulation pipe 73 includes a circulation pump 74 and a hot-line oil purifier 75. The hot-line oil purifier 75 purifies the hydraulic oil passing through the circulation pipe 73. In FIG. 3, the circulation pipe 73 is omitted for visual clarity.

The oil pressure regulator 80 of the runner vane controller 30 will now be described in detail with reference to FIG. 3.

The oil pressure regulator 80 regulates the pressure of the hydraulic oil in the system in the side of the first pipe 70a and the pressure of the hydraulic oil in the system in the side of the second pipe 70b. More specifically, during the operation of the movable-blade operation system 20, the amount of the hydraulic oil contained in the system in the side of the first pipe 70a decreases, and the amount of the hydraulic oil contained in the system in the side of the second pipe 70b also decreases. A decrease in the oil amount causes a pressure drop of the hydraulic oil. To address this, the runner vane controller 30 in the present embodiment includes the oil pressure regulator 80.

As illustrated in FIG. 3, the oil pressure regulator 80 includes a housing 81, and a first main line 82a and a second main line 82b provided in the housing 81.

The first main line 82a connects the first pipe 70a and the first port 31a of the bidirectional pump 31, whereas the second main line 82b connects the second pipe 70b and the second port 31b of the bidirectional pump 31. The first main line 82a and the second main line 82b are connected by a first bypass line 83, a second bypass line 84, and a third bypass line 85. The first bypass line 83 includes a first check valve 86a and a second check valve 86b. The second bypass line 84 includes a first relief valve 87a and a second relief valve 87b. The third bypass line 85 includes a first pilot check valve 88a and a second pilot check valve 88b.

The first bypass line 83, the second bypass line 84, and the third bypass line 85 communicate with a supply line 89 extending from the sump tank 36. The supply line 89 feeds hydraulic oil supplied from the sump tank 36 to the first bypass line 83 between the first check valve 86a and the second check valve 86b, to the second bypass line 84 between the first relief valve 87a and the second relief valve 87b, and to the third bypass line 85 between the first pilot check valve 88a and the second pilot check valve 88b.

The first check valve 86a prevents the flow of hydraulic oil from the first main line 82a to the sump tank 36, and permits the flow of hydraulic oil from the sump tank 36 to the first main line 82a. Thus, when the pressure of the hydraulic oil contained in the first main line 82a falls below the pressure of the hydraulic oil contained in the sump tank 36 (or atmospheric pressure), hydraulic oil is supplied from the sump tank 36 to the first main line 82a. Similarly, when the pressure of the hydraulic oil contained in the second main line 82b falls below the pressure of the hydraulic oil contained in the sump tank 36, the second check valve 86b allows hydraulic oil to be supplied from the sump tank 36 to the second main line 82b.

When the pressure of the hydraulic oil contained in the first main line 82a rises to a predetermined value or higher, the first relief valve 87a described above permits the flow of hydraulic oil from the first main line 82a to the sump tank 36. This mechanism prevents the pressure of the hydraulic oil contained in the first main line 82a from becoming excessively high. Similarly, when the pressure of the hydraulic oil contained in the second main line 82b rises to a predetermined value or higher, the second relief valve 87b described above permits the flow of hydraulic oil from the second main line 82b to the sump tank 36. This mechanism prevents the pressure of the hydraulic oil contained in the second main line 82b from becoming excessively high.

The first pilot check valve 88a and the second pilot check valve 88b described above permit the flow of hydraulic oil in the third bypass line 85 depending on the pressure ratio between the pressure of the hydraulic oil contained in the first main line 82a and the pressure of the hydraulic oil contained in the second main line 82b. More specifically, the first pilot check valve 88a normally prevents the flow of hydraulic oil from the first main line 82a to the sump tank 36. However, when the internal pressure of the second main line 82b increases and the ratio of the pressure in the second main line 82b to the pressure in the first main line 82a rises, the first pilot check valve 88a permits the flow of hydraulic oil from the first main line 82a to the sump tank 36. The first pilot check valve 88a also permits the flow of hydraulic oil from the second main line 82b to the first main line 82a. The first pilot check valve 88a also has the same function as the first check valve 86a described above.

Similarly, the second pilot check valve 88b normally prevents the flow of hydraulic oil from the second main line 82b to the sump tank 36. However, when the internal pressure of the first main line 82a increases and the ratio of the pressure in the first main line 82a to the pressure in the second main line 82b rises, the second pilot check valve 88b permits the flow of hydraulic oil from the second main line 82b to the sump tank 36. The second pilot check valve 88b also permits the flow of hydraulic oil from the first main line 82a to the second main line 82b. The second pilot check valve 88b also has the same function as the second check valve 86b described above.

The first main line 82a is coupled to a pressure gauge 91a via a stop valve 90a. The pressure gauge 91a indicates the pressure of the hydraulic oil contained in the first main line 82a. Similarly, the second main line 82b is coupled to a pressure gauge 91b via a stop valve 90b. The pressure gauge 91b indicates the pressure of the hydraulic oil contained in the second main line 82b.

The first main line 82a and the first port 31a of the bidirectional pump 31 are connected by a first communication line 100a. The first communication line 100a includes an exhaust valve 101a that allows the discharge of the hydraulic oil contained in the system in the side of the first pipe 70a. Similarly, the second main line 82b and the second port 31b of the bidirectional pump 31 are connected by a second communication line 100b. The second communication line 100b includes an exhaust valve 101b that allows the discharge of the hydraulic oil contained in the system in the side of the second pipe 70b.

The functional effects of the present embodiment with the described structure will now be described.

When the runner vanes 14 are turned in the first direction, the regulator 34 issues a rotational speed command value to the servo amplifier 35, and the power corresponding to the rotational speed command value is supplied from the servo amplifier 35 to the AC servomotor 32. In response, the AC servomotor 32 drives the bidirectional pump 31 to draw hydraulic oil in via the second port 31b of the bidirectional pump 31 and discharge the hydraulic oil via the first port 31a. As a result, the pressurized hydraulic oil leaves the bidirectional pump 31 via the first port 31a, flows through the first main line 82a, the first pipe 70a, the first head chamber 51a, and the first internal channel 24a, and reaches the first cylinder chamber 23a of the oil hydraulic cylinder 21. That is, the supply of the pressurized hydraulic oil increases the pressure of the hydraulic oil contained in the first cylinder chamber 23a. The increased pressure of the hydraulic oil drives the piston 22 to turn the runner vanes 14 in the first direction via the runner vane operation mechanism (not shown), and the runner vanes 14 are adjusted to a desired opening position.

During an increase in the pressure of the hydraulic oil contained in the first head chamber 51a, the opening position detector 58 detects the opening position of the runner vanes 14, and the opening position detection value for the runner vanes 14 is transmitted to the regulator 34. The regulator 34 calculates the difference between the opening position detection value and an opening position command value into which an opening command value for the runner vanes 14 transmitted from the control apparatus (not shown) is converted. When the servo amplifier 35 determines that the difference calculated by the regulator 34 is greater than a predetermined value, the servo amplifier 35 uses the changeover function to increase the rotational speed of the AC servomotor 32. This enables an increase in the hydraulic oil discharging power of the bidirectional pump 31. The increased discharging power can raise the pressure applied to the oil hydraulic cylinder 21 from the hydraulic oil, resulting in an increased speed of the runner vanes 14 turning in the first direction.

During this process, the hydraulic oil contained in the first head chamber 51a partially flows into the third head chamber 51c. The hydraulic oil that has entered the third head chamber 51c is recovered through the recovery pipe 72 and returned to the sump tank 36. The hydraulic oil returned to the sump tank 36 is, as described later, supplied to the system in the side of the first pipe 70a or the system in the side of the second pipe 70b as appropriate. This mechanism allows hydraulic oil to be circulated within the movable-blade operation system 20, and thus the deterioration of the hydraulic oil can be slowed down.

When the runner vanes 14 are turned in the second direction, the regulator 34 issues a rotational speed command value to the servo amplifier 35, and the power corresponding to the rotational speed command value is supplied from the servo amplifier 35 to the AC servomotor 32. In response, the AC servomotor 32 drives the bidirectional pump 31 to draw hydraulic oil in via the first port 31a of the bidirectional pump 31 and discharge the hydraulic oil via the second port 31b. As a result, the pressurized hydraulic oil leaves the bidirectional pump 31 via the second port 31b, flows through the second main line 82b, the second pipe 70b, the second head chamber 51b, and the second internal channel 24b, and reaches the second cylinder chamber 23b of the oil hydraulic cylinder 21. That is, the supply of the pressurized hydraulic oil increases the pressure of the hydraulic oil contained in the second cylinder chamber 23b. The increased pressure of the hydraulic oil drives the piston 22 to turn the runner vanes 14 in the second direction opposite to the first direction, and the runner vanes 14 are adjusted to a desired opening position.

During an increase in the pressure of the hydraulic oil contained in the second head chamber 51b, the opening position detector 58 detects the opening position of the runner vanes 14, and the opening position detection value for the runner vanes 14 is transmitted to the regulator 34. The regulator 34 calculates the difference between the opening position detection value and an opening position command value into which an opening command value for the runner vanes 14 transmitted from the control apparatus (not shown) is converted. When the servo amplifier 35 determines that the difference calculated by the regulator 34 is greater than a predetermined value, the servo amplifier 35 uses the changeover function to increase the rotational speed of the AC servomotor 32. This enables an increase in the hydraulic oil discharging power of the bidirectional pump 31. The increased discharging power can raise the pressure applied to the oil hydraulic cylinder 21 from hydraulic oil, resulting in an increased speed of the runner vanes 14 turning in the second direction.

During this process, the hydraulic oil contained in the second head chamber 51b partially flows into the fourth head chamber 51d. The hydraulic oil that has entered the fourth head chamber 51d is recovered through the recovery pipe 72 and returned to the sump tank 36. The hydraulic oil returned to the sump tank 36 is, as described later, supplied to the system in the side of the first pipe 70a or the system in the side of the second pipe 70b as appropriate. This mechanism allows hydraulic oil to be circulated within the movable-blade operation system 20, and thus the deterioration of the hydraulic oil can be slowed down.

During the operation of the movable-blade operation system 20, when the pressure of the hydraulic oil contained in the first head chamber 51a of the oil head 50 decreases, the first counterbalance valve 71a permits the flow of hydraulic oil from the first port 31a of the bidirectional pump 31 to the first head chamber 51a. This enables the pressure of the hydraulic oil contained in the first head chamber 51a to be increased and maintained at a certain level or higher, and prevents the entry of air, which may compromise the operability, into the first head chamber 51a, the first pipe 70a communicating with the first head chamber 51a, and the first internal channel 24a.

When the pressure of the hydraulic oil contained in the second head chamber 51b of the oil head 50 decreases, the second counterbalance valve 71b permits the flow of hydraulic oil from the second port 31b of the bidirectional pump 31 to the second head chamber 51b. This enables the pressure of the hydraulic oil contained in the second head chamber 51b to be increased and maintained at a certain level or higher, and prevents the entry of air, which may compromise the operability, into the second head chamber 51b, the second pipe 70b communicating with the second head chamber 51b, and the second internal channel 24b.

The hydraulic oil stored in the sump tank 36 is partially drawn into the circulation pipe 73 and circulated by the circulation pump 74. During the circulation, the hydraulic oil is purified by the hot-line oil purifier 75. This process enables the hydraulic oil stored in the sump tank 36 to be purified, and prevents hydraulic oil contamination, which may compromise the operability. In addition, the position of the hot-line oil purifier 75, which is not in the first pipe 70a or the second pipe 70b but in the circulation pipe 73, can prevent any malfunction in the hot-line oil purifier 75 from interfering with the operation of the oil hydraulic cylinder 21.

The functional effects of the oil pressure regulator 80 will now be described.

For example, when the ratio of the pressure of the hydraulic oil contained in the second main line 82b to the pressure of the hydraulic oil contained in the first main line 82a is high, the first pilot check valve 88a permits the flow of hydraulic oil from the first main line 82a to the sump tank 36. As a result, the hydraulic oil contained in the first main line 82a flows into the sump tank 36 to prevent an abnormal increase in the pressure of the hydraulic oil contained in the first main line 82a. More specifically, in the case where the system in the side of the first pipe 70a has a capacity larger than the capacity of the system in the side of the second pipe 70b, when hydraulic oil is drawn in via the first port 31a of the bidirectional pump 31 and discharged via the second port 31b, the piston 22 of the oil hydraulic cylinder 21 may stop unless the hydraulic oil corresponding to the capacity difference between the capacity of the system in the side of the first pipe 70a and the capacity of the system in the side of the second pipe 70b is fed to the sump tank 36. As a result, the pressure of the hydraulic oil contained in the first main line 82a may increase abnormally. In the case where the system in the side of the first pipe 70a has a capacity larger than the capacity of the system in the side of the second pipe 70b, the first pilot check valve 88a serves as a flow channel for feeding the hydraulic oil corresponding to the capacity difference between the capacity of the system in the side of the first pipe 70a and the capacity of the system in the side of the second pipe 70b to the sump tank 36 in order not to stop the piston 22. Additionally, the operation of the piston 22 can effectively prevent a pressure rise in the hydraulic oil contained in the first main line 82a.

In contrast, when the ratio of the pressure of the hydraulic oil contained in the first main line 82a to the pressure of the hydraulic oil contained in the second main line 82b is high, the second pilot check valve 88b permits the flow of hydraulic oil from the second main line 82b to the sump tank 36. As a result, the hydraulic oil contained in the second main line 82b flows into the sump tank 36 to prevent an abnormal increase in the pressure of the hydraulic oil contained in the second main line 82b. More specifically, in the case where the system in the side of the second pipe 70b has a capacity larger than the capacity of the system in the side of the first pipe 70a, when hydraulic oil is drawn in via the second port 31b of the bidirectional pump 31 and discharged via the first port 31a, the piston 22 of the oil hydraulic cylinder 21 may stop unless the hydraulic oil corresponding to the capacity difference between the capacity of the system in the side of the second pipe 70b and the capacity of the system in the side of the first pipe 70a is fed to the sump tank 36. As a result, the pressure of the hydraulic oil contained in the second main line 82b may increase abnormally. In the case where the system in the side of the second pipe 70b has a capacity larger than the capacity of the system in the side of the first pipe 70a, the second pilot check valve 88b serves as a flow channel for feeding the hydraulic oil corresponding to the capacity difference between the capacity of the system in the side of the second pipe 70b and the capacity of the system in the side of the first pipe 70a to the sump tank 36 in order not to stop the piston 22. Additionally, the operation of the piston 22 can effectively prevent a pressure rise in the hydraulic oil contained in the second main line 82b.

In this manner, the oil pressure regulator 80 can regulate the pressure of the hydraulic oil contained in the first main line 82a and the pressure of the hydraulic oil contained in the second main line 82b.

When the pressure of the hydraulic oil contained in the first main line 82a of the oil pressure regulator 80 falls below atmospheric pressure, hydraulic oil stored in the sump tank 36 is fed through the supply line 89 to the first bypass line 83. The fed hydraulic oil passes through the first check valve 86a and reaches the first main line 82a. In this manner, the first main line 82a can be supplied with the hydraulic oil to prevent the pressure of the hydraulic oil contained in the first main line 82a from falling below atmospheric pressure. The hydraulic oil from the sump tank 36 may also be fed through the supply line 89 to the third bypass line 85. The fed hydraulic oil may pass through the first pilot check valve 88a and reach the first main line 82a.

Similarly, when the pressure of the hydraulic oil contained in the second main line 82b of the oil pressure regulator 80 falls below atmospheric pressure, hydraulic oil stored in the sump tank 36 is fed through the supply line 89 to the first bypass line 83. The fed hydraulic oil passes through the second check valve 86b and reaches the second main line 82b. In this manner, the second main line 82b can be supplied with the hydraulic oil to prevent the pressure of the hydraulic oil contained in the second main line 82b from falling below atmospheric pressure. The hydraulic oil from the sump tank 36 may also be fed through the supply line 89 to the third bypass line 85. The fed hydraulic oil may pass through the second pilot check valve 88b and reach the second main line 82b.

According to the present embodiment, the bidirectional pump 31 can directly feed pressurized hydraulic oil to the oil hydraulic cylinder 21 without using an existing pressure oil tank. This allows the movable-blade operation system 20 to reduce the amount of hydraulic oil usage. With this system, even if an oil leakage should happen, its amount can be reduced. The system can thus have a reduced environmental impact. Furthermore, the bidirectional pump 31 according to the present embodiment, which directly feeds pressurized hydraulic oil to the oil hydraulic cylinder 21, can drive the oil hydraulic cylinder 21 with power consumption lower than the way of pressurizing the hydraulic oil stored in the pressure oil tank. Thus, the movable-blade operation system 20 can consume lower energy, contributing to improved energy conservation.

According to the present embodiment, the oil hydraulic cylinder 21 and the oil head 50 are installed within the bulb 11 of the bulb turbine 10, whereas the runner vane controller 30 including the bidirectional pump 31, the AC servomotor 32, and the control unit 33 is installed outside the bulb 11 of the bulb turbine 10. Thus, if an existing movable-blade operation system including a pressure oil tank, a compressor, and other components outside a bulb turbine 10 is modified into the movable-blade operation system 20 according to the present embodiment, the pressure oil tank, the compressor, and the other components may be replaced with the runner vane controller 30 according to the present embodiment. In this case, the bulb 11 of the bulb turbine 10 may not be remodeled. Thus, the existing movable-blade operation system can be easily modified into the movable-blade operation system 20, which can reduce the amount of hydraulic oil usage.

According to the present embodiment, as described above, the runner vane controller 30 including the bidirectional pump 31, the AC servomotor 32, and the control unit 33 is installed outside the bulb 11 of the bulb turbine 10. This allows the runner vane controller 30 to be operated and inspected not inside the bulb 11 but outside the bulb 11, resulting in an improvement in workability.

In the embodiment described above, the first counterbalance valve 71a and the second counterbalance valve 71b are installed outside the runner vane controller 30. However, this is not restrictive. The first counterbalance valve 71a and the second counterbalance valve 71b may be incorporated in the runner vane controller 30.

In the present embodiment described above, the circulation pipe 73 coupled with the sump tank 36 includes the hot-line oil purifier 75. However, this is not restrictive. The hot-line oil purifier 75 may be installed in the recovery pipe 72. In this case, the recovery pipe 72 suitably includes a pump (not shown) that draws hydraulic oil in from the third head chamber 51c and the fourth head chamber 51d of the oil head 50. This pump is preferably driven depending on the oil level of the hydraulic oil contained in the third head chamber 51c, detected by the oil level detector 59. For example, the pump is preferably driven if the detected oil level is higher than a predetermined upper limit, and stopped if the detected oil level is lower than a predetermined lower limit.

The embodiment described above allows an existing movable-blade operation system to be easily modified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the embodiment described above, although the hydraulic machine is a vertical shaft bulb turbine, this is not restrictive. The movable-blade operation system is applicable to a horizontal shaft bulb turbine as well as to a hydraulic machine other than a bulb turbine, such as a Kaplan turbine.

The invention claimed is:

1. A movable-blade operation system for a hydraulic machine, for adjusting opening of movable blades that rotate together with a rotational shaft of the hydraulic machine, the system comprising:
    an oil hydraulic cylinder installed within the rotational shaft, the oil hydraulic cylinder including a piston coupled to the movable blades, and including a first cylinder chamber and a second cylinder chamber that are defined by the piston;
    a bidirectional pump configured to selectively feed pressurized hydraulic oil to one of the first cylinder chamber and the second cylinder chamber;
    a pump drive motor configured to drive the bidirectional pump;
    a controller configured to control the pump drive motor;
    an oil head installed in the hydraulic machine and rotatably coupled to the rotational shaft, the hydraulic oil to be fed from the bidirectional pump to the first cylinder chamber and the second cylinder chamber flowing through the oil head; and
    a sump tank configured to store hydraulic oil to be fed to the first cylinder chamber and the second cylinder chamber,
    wherein the bidirectional pump, the pump drive motor, the controller, and the sump tank are installed outside the hydraulic machine,
    wherein the bidirectional pump and the oil head are coupled by a first pipe communicating with the first cylinder chamber and by a second pipe communicating with the second cylinder chamber,
    wherein the first pipe and the second pipe are connected by a bypass line,
    wherein the bypass line communicates with a supply line extending from the sump tank,
    wherein a first valve controlling the flow of the hydraulic oil between the first pipe and the sump tank is provided on the side of the first pipe with respect to a communication point with the supply line in the bypass line, and
    a second valve controlling the flow of the hydraulic oil between the second pipe and the sump tank is provided on the side of the second pipe with respect to a communication point with the supply line in the bypass line.

2. The movable-blade operation system according to claim 1, wherein
    the first pipe and the second pipe extend through an access port allowing an internal inspection of the hydraulic machine.

3. The movable-blade operation system according to claim 1, wherein
    the first pipe includes a first counterbalance valve, and the second pipe includes a second counterbalance valve.

4. The movable-blade operation system according to claim 1, wherein
    the controller includes a regulator configured to issue a rotational speed command value for the pump drive motor, and an amplifier configured to supply the pump drive motor with power corresponding to the rotational speed command value issued from the regulator, and
    the amplifier is configured to execute a changeover function for increasing a rotational speed of the pump drive motor when a difference between an opening position detection value for the movable blades and an opening position command value for the movable blades is greater than a predetermined value.

5. The movable-blade operation system according to claim 1, further comprising
    a recovery pipe coupling the sump tank and the oil head, wherein the recovery pipe returns a part of hydraulic oil in the oil head to the sump tank.

6. The movable-blade operation system according to claim 5, further comprising
    an oil purifier configured to purify hydraulic oil.

* * * * *